(12) United States Patent
Wang et al.

(10) Patent No.: US 8,561,826 B2
(45) Date of Patent: Oct. 22, 2013

(54) UNIVERSAL GASOLINE ENGINE FUEL TANK COVER

(75) Inventors: Yichao Wang, Chongqing (CN); Huarong Li, Chongqing (CN); Junjie Pei, Chongqing (CN)

(73) Assignee: Chongqing Zongshen General Power Machine Co., Ltd. (CN)

( * ) Notice: Subject to any disclaimer, the term of this patent is extended or adjusted under 35 U.S.C. 154(b) by 0 days.

(21) Appl. No.: 13/574,910

(22) PCT Filed: Dec. 31, 2011

(86) PCT No.: PCT/CN2011/085219
§ 371 (c)(1),
(2), (4) Date: Jul. 24, 2012

(87) PCT Pub. No.: WO2012/163077
PCT Pub. Date: Dec. 6, 2012

(65) Prior Publication Data
US 2013/0001229 A1     Jan. 3, 2013

(30) Foreign Application Priority Data
Jun. 2, 2011 (CN) .......................... 2011 2 0184467

(51) Int. Cl.
*B65D 51/16* (2006.01)
*B65D 1/24* (2006.01)

(52) U.S. Cl.
USPC .................. 220/373; 220/367.1; 220/521

(58) Field of Classification Search
USPC ............. 220/863, 86.2, 86.1, 522, 521, 325, 220/315, 324, 298, 301, 300, 288, 367.1; 123/519
See application file for complete search history.

(56) References Cited

U.S. PATENT DOCUMENTS

| | | | |
|---|---|---|---|
| 3,961,724 A * | 6/1976 | Kapsy | 220/371 |
| 4,136,796 A * | 1/1979 | Dubois et al. | 220/259.4 |
| 4,299,102 A * | 11/1981 | Aro | 70/165 |
| 5,110,003 A * | 5/1992 | MacWilliams | 220/304 |
| 5,395,004 A * | 3/1995 | Griffin et al. | 220/295 |
| RE36,959 E * | 11/2000 | Griffin | 220/210 |
| 7,048,140 B1 * | 5/2006 | Caldwell | 220/371 |
| 7,261,093 B2 * | 8/2007 | Groom et al. | 123/520 |

(Continued)

*Primary Examiner* — J. Gregory Pickett
*Assistant Examiner* — Kaushikkumar Desai
(74) *Attorney, Agent, or Firm* — Lerner, David, Littenberg, Krumholz & Mentlik, LLP

(57) ABSTRACT

The present utility model discloses a universal gasoline engine fuel tank cover including an outer shell, an inner shell and a sealing cover located on the upper surface of the inner shell, wherein the outer shell and the inner shell are connected through a ratchet mechanism and a limiting mechanism, the inner shell having a partition I and a partition II disposed in its upper cavity to divide the upper cavity into a first adsorption chamber, a second adsorption chamber and a third adsorption chamber, the first adsorption chamber and the second adsorption chamber having fine carbon particles disposed therein, the third adsorption chamber having a cylindrical foam disposed therein, the bottom of the partition I being disposed with an air hole I connecting the third adsorption chamber to the fuel tank, and the bottom of the first adsorption chamber being disposed with an air hole II causing the first adsorption chamber to be connected to the atmosphere outside. The present utility model is advantageous in that it has a delicate structural design, it is easy to assemble, its cost is low, it can effectively prevent direct exhaust of volatilized gasoline into the atmosphere, and accurate judgment can be made as to whether the fuel tank cover is adequately tightened.

10 Claims, 4 Drawing Sheets

(56) References Cited

U.S. PATENT DOCUMENTS

| | | | |
|---|---|---|---|
| 7,320,314 B2* | 1/2008 | Kashima et al. | 123/519 |
| 7,703,629 B2* | 4/2010 | Nelson | 220/371 |
| 7,997,254 B2* | 8/2011 | Defilippi | 123/518 |
| 8,113,376 B2* | 2/2012 | Matsubara et al. | 220/304 |
| 2006/0266338 A1* | 11/2006 | Kashima et al. | 123/519 |
| 2013/0001229 A1* | 1/2013 | Wang et al. | 220/373 |

* cited by examiner

UNIVERSAL GASOLINE ENGINE FUEL TANK COVER

CROSS-REFERENCE TO RELATED APPLICATIONS

The present application is a national phase entry under 35 U.S.C. §371 of International Application No. PCT/CN2011/085219 filed Dec. 31, 2011, filed in Chinese, which claims priority from Chinese Patent Application No. 201120184467.8 filed Jun. 2, 2011, all of which are incorporated herein by reference.

FIELD

The present utility model relates generally to a universal gasoline engine and, more particularly, to a universal gasoline engine fuel tank cover.

BACKGROUND

An existing universal gasoline engine fuel tank cover mainly comprises an outer shell, a card lock pedestal, a plastic disc, a card lock slice and a fuel tank inner cover. The outer shell and the card lock pedestal are riveted and a plastic disc is supported between the card lock pedestal and the outer shell, the plastic disc has a fuel tank inner cover disposed in the bottom cavity thereof, the card lock pedestal has a card lock slice connected to the bottom thereof, the plastic disc has a plurality of projected ribs disposed at the top portion thereof, the projected ribs being disposed with air gaps thereon, the plastic disc, fuel tank inner cover, card lock pedestal and card lock slice being respectively disposed with ventilation holes, and the fuel tank inner cavity being connected to the atmosphere through these ventilation holes when the fuel tank is covered. When the universal engine is running, air enters the fuel tank through the ventilation holes on the plastic disc, the fuel tank inner cover, the card lock pedestal and the card lock slice respectively to supplement the air pressure in the fuel tank so as to ensure regular supply of gasoline in the fuel tank to the engine. When the universal engine stops running, the gasoline vapor in the fuel tank is directly exhausted to the atmosphere through these ventilation holes. In addition, when the universal engine is excessively tilted or inclined, gasoline in the fuel tank will still flow out through this ventilation channel, and this does not only cause fuel wastage but also environmental pollution. In order to overcome the problems associated with direct exhaust of volatilized gasoline to the atmosphere and gasoline leakage during pouring, many manufacturers use carbon canisters and pour valves. However, as carbon canisters and pour valves are separate parts, assembly is made complicated and manufacturing cost is increased.

SUMMARY OF THE UTILITY MODEL

The present utility model aims to provide a universal gasoline fuel tank cover capable of preventing direct exhaust of volatilized gasoline to the atmosphere.

The aim of the present utility model is achieved by the following scheme: a universal gasoline engine fuel tank cover, comprising an outer shell, an inner shell and a sealing cover located on the upper surface of the inner shell, characterized in that the outer shell and the inner shell are connected through a ratchet mechanism and a limiting mechanism, the inner shell having a partition I and a partition II disposed in its upper cavity to divide the upper cavity inwardly into a first adsorption chamber, a second adsorption chamber and a third adsorption chamber, the first adsorption chamber and the second adsorption chamber having fine carbon particles disposed therein, the third adsorption chamber having a cylindrical foam disposed therein, the bottom of the partition I being disposed with an air hole I connecting the third adsorption chamber to the fuel tank, and the bottom of the first adsorption chamber being disposed with an air hole II causing the first adsorption chamber to be connected to the atmosphere outside. The designs of the first adsorption chamber and the second adsorption chamber increase gas passage and absorption effect.

The second adsorption chamber has an under prop cover disposed therein, the under prop cover having the partition II sheathed in the inner cavity thereof, the under prop cover having a convex platform disposed with a plurality of evenly distributed grids circumferentially around the bottom surface thereof, the grids having an inner height lower than its outer height, and each of the plurality of grids being disposed with an air inlet hole. Volatilized gasoline passes through the third adsorption chamber, the gap between the partition II and the under prop cover, and the air inlet holes at the bottom of the under prop cover, and enters the second adsorption chamber filled with fine carbon particles.

In order to prevent leakage of the fine carbon particles to the outside or the fuel tank, the first adsorption chamber and the second adsorption chamber are disposed with a ventilation cushion I and a ventilation cushion II respectively, the ventilation cushion I being located at the bottom of the first adsorption chamber, and the ventilation cushion II being sheathed onto the convex platform of the under prop cover.

The air inlet holes on the under prop cover are circumferentially spread, below the ventilation cushion II is a circumferential cavity, and a ventilation gap is disposed between the partition I on the inner shell and the sealing cover to facilitate even circulation of volatilized gasoline along the circumference and enhanced absorption effect of the fine carbon particles.

In order to accurately determine whether the fuel tank cover is adequately tightened, the ratchet mechanism comprises a plurality of internal ratchet teeth disposed on the inner wall of the outer shell and a plurality of external ratchet teeth disposed on the outer wall of the inner shell and matching the plurality of internal ratchet teeth, the engagement surface between the external ratchet teeth and the internal ratchet teeth in the tightening direction being inclined and the engagement surface therebetween in the untightening direction being perpendicular. In the present utility model, the external ratchet teeth are involute-shaped, i.e. the distance between the gear root and the inner wall of the outer shell along the gear root-gear rack direction is gradually reduced. As deformation is smaller when the external ratchet teeth are near their roots, contact between the internal ratchet teeth and the roots of the external ratchet teeth is avoided when being tightened, and as deformation is small at the roots, the internal ratchet teeth are not prone to leap over the external ratchet teeth.

In order to limit the vertical movement between the outer shell and the inner shell, the limiting mechanism comprises a raised surface and limiting convex platforms disposed on the outer shell and a limiting circumference disposed on the inner shell. The upper sides of the external ratchet teeth are located beneath the raised surface, and the limiting circumference is located on the upper sides of the limiting convex platforms.

The limiting mechanism comprises an inward-projecting raised surface disposed integrally with the outer shell in the middle portion thereof, a limiting circumference disposed at the lower part of the outer wall of the inner shell and limiting convex platforms disposed on the inner wall of the outer shell, the limiting circumference being located on the upper side of the limiting convex platform, and the external ratchet teeth and the internal ratchet teeth being located on the lower side of the raised surface when the outer shell and the inner shell are tightened.

For stress uniformity, the number of the limiting convex platforms is above two and they are evenly distributed along the circumference of the inner wall of the outer shell.

In order to limit the radial movement between the outer shell and the inner shell, the internal ratchet teeth are in zero-clearance contact with the distal ends of the cantilever arms of the external ratchet teeth, and a small clearance exists between the outer circumferential surface of the limiting circumference of the inner shell and the inner wall of the outer shell. Both schemes are capable of limiting the radial swaying movement between the outer shell and the inner shell.

The first adsorption chamber is disposed with support ribs at the bottom thereof, and the ventilation cushion I is located on the support ribs, so that a cavity is formed at the lower side of the ventilation cushion I to ensure smooth passage of gas and that the cavity and the atmosphere are connected.

The outer shell is disposed with projected ribs on the inner wall thereof to ensure connection between the air hole II and the atmosphere. The distance between the ribs and the limiting circumference is very small or there is zero clearance between them, and this reduces the swaying movement between the inner shell and the outer shell.

A foam cover is disposed between the fine carbon particles in the first absorption chamber and the second absorption chamber and the lower surface of the sealing cover. The foam cover is adequately compressed and deformed by the sealing cover, and the fine carbon particles are adequately compressed in the first and second absorption chambers to prevent the fine carbon particles from being swayed between the first and second absorption chambers and the sealing cover.

The present utility model is advantageous in that it has a delicate structural design, it is easy to assemble, its cost is low, it can effectively prevent direct exhaust of volatilized gasoline into the atmosphere, and accurate judgment can be made as to whether the fuel tank cover is adequately tightened.

In the figures, (1) denotes outer shell, (2) denotes inner shell, (3) denotes sealing cover, (4) denotes first adsorption chamber, (5) denotes second adsorption chamber, (6) denotes third adsorption chamber, (7) denotes partition I, (8) denotes partition II, (9) denotes under prop cover, (10) denotes fine carbon particles, (11) denotes foam, (12) denotes air hole I, (13) denotes internal ratchet teeth, (14) denotes external ratchet teeth, (15) denotes raised surface, (16) denotes limiting circumference, (17) denotes limiting convex platforms, (18) denotes ventilation cushion I, (19) denotes ventilation cushion II, (20) denotes convex platform, (21) denotes grids, (22) denotes air inlet hole, (23) denotes support ribs, (24) denotes air hole II, (25) denotes projected ribs, and (26) denotes foam cover.

DETAILED DESCRIPTION

The present utility model will be further illustrated in connection with the drawings by the following embodiment which shall not be construed as limiting, and any improvement or substitution based on the spirit of the present utility embodiment would still fall within the scope of the claims defining the utility model.

Figure 1:
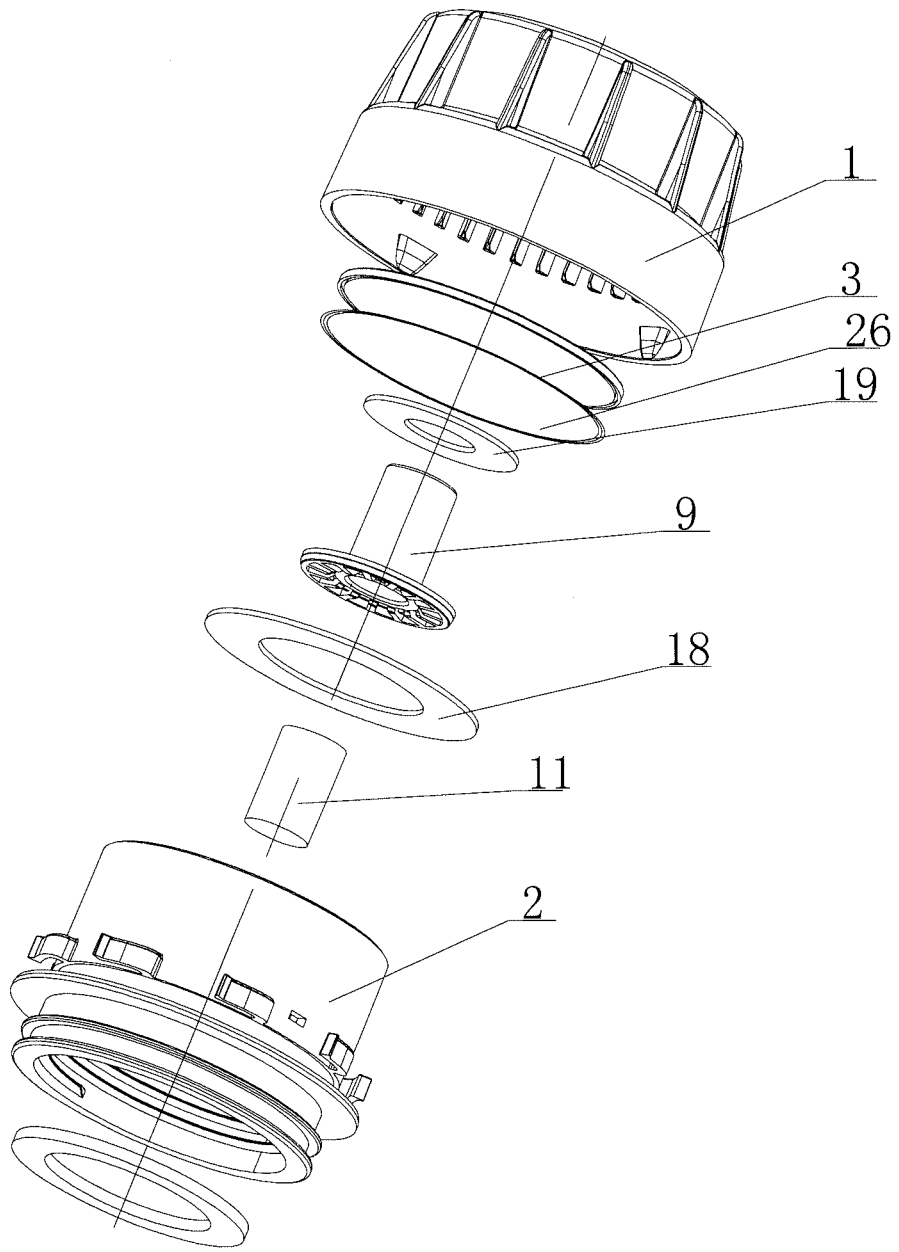
FIG. 1 is an exploded drawing of the present utility model.
Figure 2:
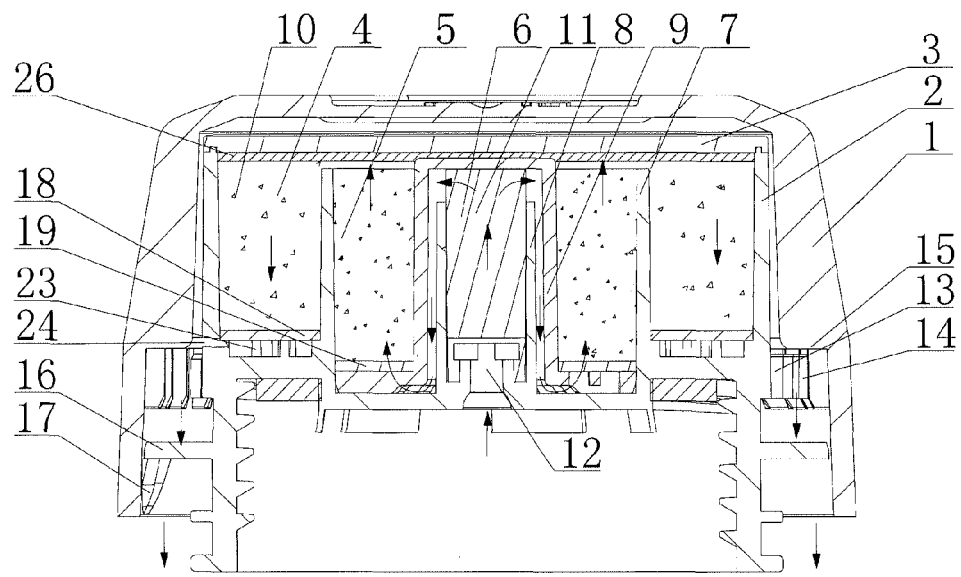
FIG. 2 is a sectional drawing showing the assembly of the present utility model.

FIGS. 1 and 2 illustrate a universal gasoline engine fuel tank cover, comprising an outer shell (1), an inner shell (2) and a sealing cover (3) located on the upper surface of the inner shell (2), wherein the outer shell (1) and the inner shell (2) are connected through a ratchet mechanism and a limiting mechanism for torsional control, the inner shell (2) having a partition I (7) and a partition II (8) disposed in its upper cavity to divide the upper cavity inwardly into a first adsorption chamber (4), a second adsorption chamber (5) and a third adsorption chamber (6), the partition I (7) and the sealing cover (3) having a ventilation clearance disposed therebetween, the second adsorption chamber (5) having a under prop cover (9) disposed therein, the under prop cover (9) having the outer wall of the partition II (8) sheathed in the inner cavity thereof, the inner cavity of the under prop cover (9) and the outer wall of the partition II (8) having a ventilation clearance disposed therebetween. The first adsorption chamber (4) and the second adsorption chamber (5) have fine carbon particles (10) disposed therein, the third adsorption chamber (6) has a cylindrical foam (11) disposed therein, the bottom of the third adsorption chamber (6) being disposed with an air hole I (12) connecting the third adsorption chamber (6) to the fuel tank, and the bottom of the first adsorption chamber (4) being disposed with an air hole II (24) connecting the first adsorption chamber (4) to the atmosphere. The air hole II (24) causes the fuel tank to be connected to the atmosphere and ensures that no negative pressure is formed in the fuel tank, thereby causing smooth entry of fuel into the carburetor and ensuring regular fuel supply when the universal fuel engine is running. The designs of the first adsorption chamber (4) and the second adsorption chamber (5) increase gas passage and absorption effect. A foam cover (26) is disposed between the tops of the first t adsorption chamber (4) and the second adsorption chamber (5) and the bottom of the sealing cover (3), and the foam cover (26) is fitted after fine carbon particles (1) have been filled into the first t adsorption chamber (4) and the second adsorption chamber (5), and followed by the fitting of the sealing cover (3). The foam cover (26) is adequately compressed and deformed by the sealing cover (3), and the fine carbon particles (10) are adequately compressed in the first and second absorption chambers to prevent the fine carbon particles (10) from being swayed between the first and second absorption chambers and the sealing cover (3).

The route of volatilized gasoline is shown in FIG. 2. When the gasoline engine is running, fuel particles splash to the fuel tank cover and are absorbed by the foam (11) in the fuel tank cover. There would be volatilized gasoline whether the universal gasoline engine is off or running. The gas passes through the clearance between the third adsorption chamber (6) and the partition II (8) and the wall of the under prop cover, the air inlet hole (22) at the bottom of the under prop cover and evenly enters the second adsorption chamber (5) and the first adsorption chamber (4) filled with fine carbon particles. Through adsorption by the fine carbon particles (10) in the second adsorption chamber (5) and the first adsorption chamber (4), volatilized gasoline is not able to enter the atmosphere. When the universal gasoline engine is running, fuel level in the fuel tank gradually drops and air in the atmosphere is able to enter the fuel tank in the direction opposite to the route of gasoline volatilization, and the incoming air is capable of conveying (i.e. de-adsorbing) into the tank a portion of the volatilized gasoline already adsorbed on the fine carbon particles.

The first adsorption chamber (4) is disposed with a ventilation cushion I (18) at the bottom thereof to prevent leakage of the fine carbon particles to the atmosphere outside. The second adsorption chamber (5) is disposed with a ventilation cushion II (19) at the bottom thereof, the ventilation cushion II (19) being sheathed onto the convex platform (20) of the under prop cover (9) to prevent leakage of the fine carbon particles into the fuel tank. The ventilation cushion I (18) and the ventilation cushion II (19) enable gas to pass through freely.

Figure 6:
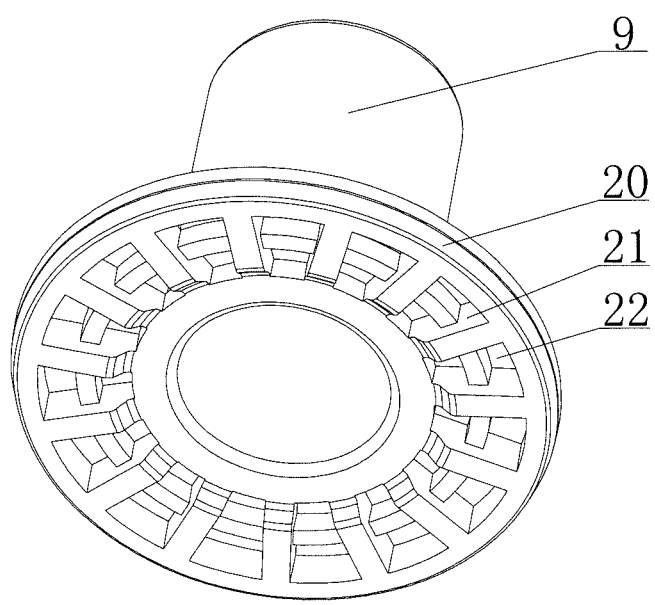
FIG. 6 is a drawing showing the structure of the under prop cover of the present utility model.

As shown in FIG. 6, the convex platform (20) of the under prop cover (9) is disposed with a plurality of evenly distributed grids (21) circumferentially around the bottom surface thereof, the grids (21) having an inner height lower than its outer height, and each of the plurality of grids (21) being disposed with an air inlet hole (22). This enables volatilized gasoline to evenly enter the upper cavity of the inner shell (2) along the circumferential direction.

The first adsorption chamber (4) is disposed with support ribs (23) at the bottom thereof, and the ventilation cushion I (18) is located on the support ribs (23). Thus a cavity is formed between the ventilation cushion I (18) and the first adsorption chamber (4) to ensure smoother passage of gas.

The partition I (7) and the sealing cover (3) have a clearance disposed therebetween, and the partition II (8) and the under prop cover (9) have a ventilation clearance disposed therebetween to facilitate even and smooth gas flow.

Figure 3:
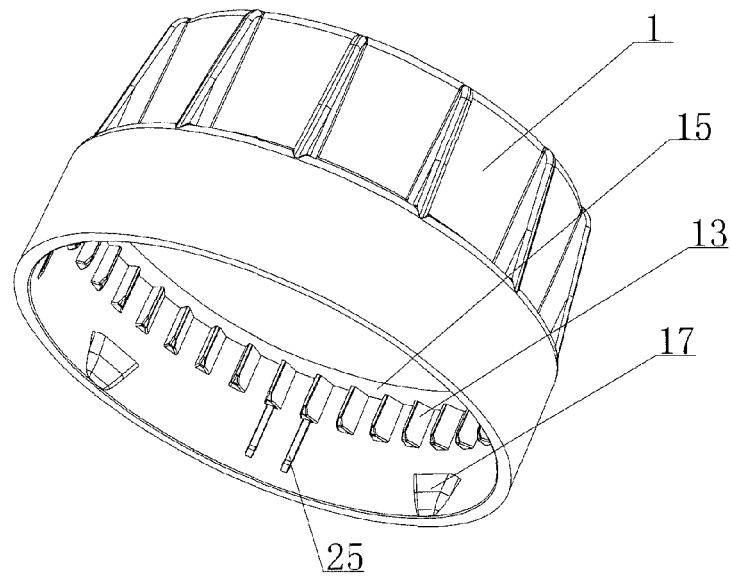
FIG. 3 is a drawing showing the outer shell structure of the present utility model.
Figure 4:
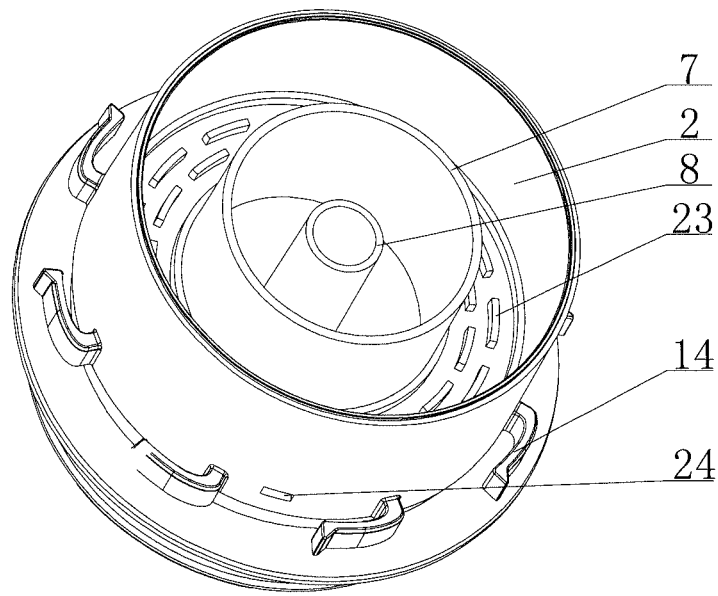
FIG. 4 is a drawing showing the inner shell structure of the present utility model.
Figure 5:
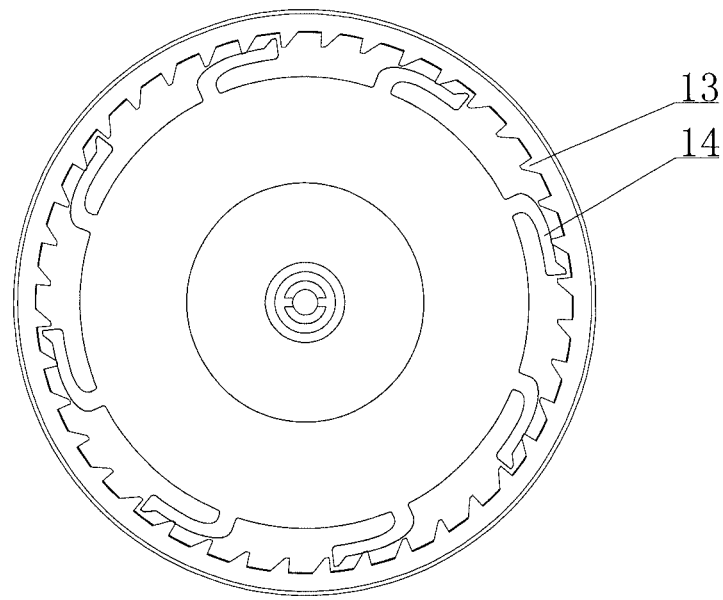
FIG. 5 is a drawing showing the engagement between ratchet teeth and ratchet of the present utility model.

As shown in FIGS. 3, 4 and 5, the ratchet mechanism comprises a plurality of internal ratchet teeth (13) disposed on the inner wall of the outer shell (1) and a plurality of external ratchet teeth (14) disposed on the outer wall of the inner shell (2) and matching the plurality of internal ratchet teeth (13), the engagement surface between the external ratchet teeth (14) and the internal ratchet teeth (13) in the tightening direction being inclined and the engagement surface therebetween in the untightening direction being perpendicular.

In the present embodiment, when the fuel tank is adequately tightened its inner shell (2) will not rotate. When rotation of the outer shell (1) is continued and along with the increase of external force, the external ratchet teeth (14) are stressed and deformed as the stressed surfaces are inclined. The internal ratchet teeth (13) leap over the external ratchet teeth (14) and the external ratchet teeth (14) subsequently return and rapidly contact the internal ratchet teeth (13), and the "ka-ka" sound generated indicates that the fuel tank cover is adequately tightened. During untightening, the outer shell (1) is rotated anticlockwise the vertical portions of the internal ratchet teeth (13) drive the vertical portions of the external ratchet teeth (14) of the inner shell (2) and the internal ratchet teeth (13) are rotated to untighten the fuel tank cover.

In order to limit the vertical movement between the outer shell and the inner shell, the limiting mechanism comprises a raised surface (15) and limiting convex platforms (17) disposed on the outer shell (1) and a limiting circumference (16) disposed on the inner shell (2). After tightening, the upper sides of the external ratchet teeth (14) are located beneath the raised surface (15), and the limiting circumference (16) is located on the upper sides of the limiting convex platforms (17). The two limiting mechanisms disposed on the inner shell (2) are limited between the two limiting mechanisms disposed on the outer shell (1), thereby limiting the vertical movement between the outer shell (1) and the inner shell (2).

For stress uniformity, the number of the limiting convex platforms (17) may be between three to eight (four in this embodiment), and they are evenly distributed along the circumference of the inner wall of the outer shell (1).

The zero-clearance contact between the internal ratchet teeth (13) and the distal ends of the cantilever arms of the external ratchet teeth (14) limits the radial movement between the outer shell (1) and the inner shell (2), and a small clearance exists between the outer circumferential surface of the limiting circumference (16) of the inner shell (2) and the inner wall of the outer shell (1). In order to prevent zero clearance, the outer shell (1) is disposed with projected ribs (25) on the inner wall thereof to ensure connection between the air hole II (24) and the atmosphere. The distance between the ribs (25) and the limiting circumference (16) is very small or there is zero clearance between them, and this reduces the swaying movement between the inner shell (2) and the outer shell (1).

The invention claimed is:

1. A universal gasoline engine fuel tank cover, comprising an outer shell, an inner shell and a sealing cover located on the upper surface of the inner shell, characterized in that the outer shell and the inner shell are connected through a ratchet mechanism and a limiting mechanism, the inner shell having a partition I and a partition II disposed in its upper cavity to divide the upper cavity inwardly into a first adsorption chamber, a second adsorption chamber and a third adsorption chamber, the first adsorption chamber and the second adsorption chamber having fine carbon particles disposed therein, the third adsorption chamber having a cylindrical foam disposed therein, the bottom of the partition I being disposed with an air hole I connecting the third adsorption chamber to the fuel tank, and the bottom of the first adsorption chamber being disposed with an air hole II causing the first adsorption chamber to be connected to the atmosphere outside.

2. A universal gasoline engine fuel tank cover as defined in claim 1, characterized in that the second adsorption chamber has an under prop cover disposed therein, the under prop cover having the partition II sheathed in the inner cavity thereof, the under prop cover having a convex platform disposed with a plurality of evenly distributed grids circumferentially around the bottom surface thereof, the grids having an inner height lower than its outer height, and each of the plurality of grids being disposed with an air inlet hole.

3. A universal gasoline engine fuel tank cover as defined in claim 2, characterized in that the first adsorption chamber and the second adsorption chamber are disposed with a ventilation cushion I and a ventilation cushion II respectively, the ventilation cushion I being located at the bottom of the first adsorption chamber, and the ventilation cushion II being sheathed onto the convex platform of the under prop cover.

4. A universal gasoline engine fuel tank cover as defined in claim 1, characterized in that the ratchet mechanism comprises a plurality of internal ratchet teeth disposed on the inner wall of the outer shell and a plurality of external ratchet teeth disposed on the outer wall of the inner shell and matching the plurality of internal ratchet teeth, the engagement surface between the external ratchet teeth and the internal ratchet teeth in the tightening direction being inclined and the engagement surface therebetween in the untightening direction being perpendicular, and the external ratchet teeth being involute-shaped, i.e. the distance between the gear root and the inner wall of the outer shell along the gear root-gear rack direction being gradually reduced.

5. A universal gasoline engine fuel tank cover as defined in claim 4, characterized in that the limiting mechanism comprises an inward-projecting raised surface disposed integrally with the outer shell in the middle portion thereof, a limiting circumference disposed at the lower part of the outer wall of the inner shell and limiting convex platforms disposed on the inner wall of the outer shell, the limiting circumference being located on the upper side of the limiting convex platform, and the external ratchet teeth and the internal ratchet teeth being located on the lower side of the raised surface.

6. A universal gasoline engine fuel tank cover as defined in claim 5, characterized in that the number of the limiting convex platforms is above two and they are evenly distributed along the circumference of the inner wall of the outer shell.

7. A universal gasoline engine fuel tank cover as defined in claim 6, characterized in that the internal ratchet teeth are in contact with the distal ends of the cantilever arms of the external ratchet teeth, and a small clearance exists between the outer circumferential surface of the limiting circumference of the inner shell and the inner wall of the outer shell.

8. A universal gasoline engine fuel tank cover as defined in claim 7, characterized in that the first adsorption chamber is disposed with support ribs at the bottom thereof, and the ventilation cushion I is located on the support ribs.

9. A universal gasoline engine fuel tank cover as defined in claim 8, characterized in that the outer shell is disposed with projected ribs on the inner wall thereof to ensure connection between the air hole II and the atmosphere.

10. A universal gasoline engine fuel tank cover as defined in claim 9, characterized in that a foam cover is disposed between the fine carbon particles and the lower surface of the sealing cover.

\* \* \* \* \*